A. B. LLOYD.
DISH PAN.
APPLICATION FILED FEB. 19, 1915.
1,154,521.
Patented Sept. 21, 1915.
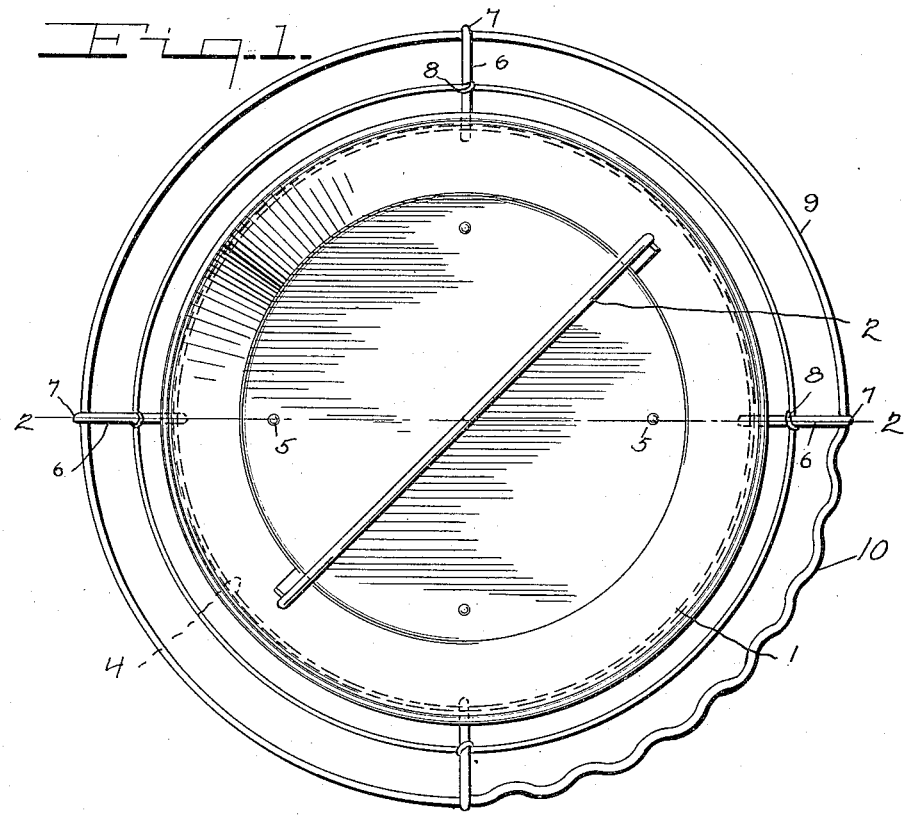
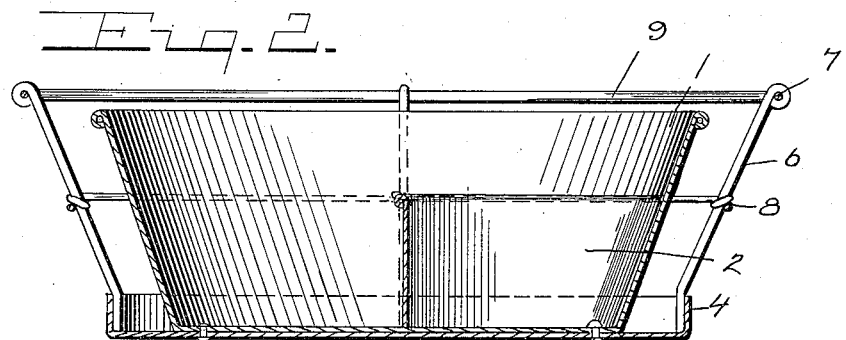
Witnesses
M. Jones
W. F. Davidson
Inventor
Annie B. Lloyd
By
Attorney

UNITED STATES PATENT OFFICE.

ANNIE B. LLOYD, OF KEITHSBURG, ILLINOIS.

DISH-PAN.

1,154,521. Specification of Letters Patent. Patented Sept. 21, 1915.

Application filed February 19, 1915. Serial No. 9,470.

*To all whom it may concern:*

Be it known that I, ANNIE B. LLOYD, a citizen of the United States, residing at Keithsburg, in the county of Mercer and State of Illinois, have invented certain new and useful Improvements in Dish-Pans; and I do hereby declare the following to be a full, clear, and exact description of the invention, such as will enable others skilled in the art to which it appertains to make and use the same.

This invention relates to new and useful improvements in combination dish pan and dish strainer and has for its object to provide a device which can be cheaply manufactured and placed upon the market at a low cost.

A further object of this invention is to provide a device whereby the dishes may be washed in one side of the pan and rinsed or cleansed in the opposite side and later placed within the rack surrounding the pan for draining.

A still further object of this invention is to provide a device which will catch the drainage from the dishes after they have been placed within the rack.

With this and further objects in view the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

Figure 1 is a top plan view, and Fig. 2 is a vertical section taken on the lines 2—2 of Fig. 1.

Like reference numerals designate corresponding parts in all of the figures of the drawings.

Referring to the drawings 1 designates a wash pan provided with a partition 2 secured to the bottom and side walls of the pan 1, terminating at approximately half of the height of the pan. This partition 2 will divide the pan 1 into two compartments, one of which is adapted to hold the soapy water and the other to contain hot water for cleansing purposes.

A receptacle 3 is provided with upturned flanges 4 and is riveted as illustrated at 5 to the bottom of the pan 1, providing means for receiving the drippings from the dishes after being washed. A plurality of upstanding arms 6 are secured to the upturned flange 4 of the receptacle. The lower ends of the upstanding arms 6 are bent to vertical alinement with the flange 4 and then are bent outwardly from the top edge of the flange 4 terminating in eyelets 7 at the free end thereof. A continuous rod is adapted to extend around said upstanding arms 6 intermediate the ends and below the top edge of the pan 1. This rod is adapted to be bent around the upstanding arms 6 as illustrated at 8. This rod forms a rack for holding saucers and other small articles between the pan 1 and the framework for draining. A second rod 9 is adapted to pass through the eyelet 7 formed on the upper ends of the upstanding arm 6 forming an upper rack above the top edge of the pan 1 for supporting larger dishes and such articles. A portion of the upper rod 9 is bent or corrugated to provide a plurality of relatively spaced recesses 10 to receive the sides of cups, glasses or like articles, resting upon the upper adjacent edge of the pan 1, whereby such articles may be safely supported until they are washed or until they drain after being washed.

It will be readily seen that the applicant has provided a device which can be easily and cheaply manufactured and also provides a device in which the dishes can be washed, rinsed and drained in one device. The placing of the rack around the entire circumference of the pan 1 provides means for balancing said pan and preventing its being overturned.

Having thus described my invention, I claim:

A dish pan comprising a shallow receptacle, a wash pan secured to the receptacle and having its side wall spaced from and extending above the side wall of the receptacle, arms secured to the side wall of the receptacle and extending therefrom to a point above the upper edge of the wash pan, an annular rod secured to the arms at a point between the upper edge of the receptacle and the upper edge of the wash pan, and another annular rod secured to the arms at a point above the upper edge of the wash pan, a portion of said other rod being bent to provide a plurality of relatively spaced recesses.

In testimony whereof I affix my signature in presence of two witnesses.

ANNIE B. LLOYD.

Witnesses:
O. H. LLOYD,
C. M. LLOYD.

Copies of this patent may be obtained for five cents each, by addressing the "Commissioner of Patents, Washington, D. C."